No. 654,540. Patented July 24, 1900.
H. H. HOKE.
MACHINE FOR CUTTING GREEN CORN FROM COBS.
(Application filed Jan. 13, 1900.)
(No Model.) 4 Sheets—Sheet 1.
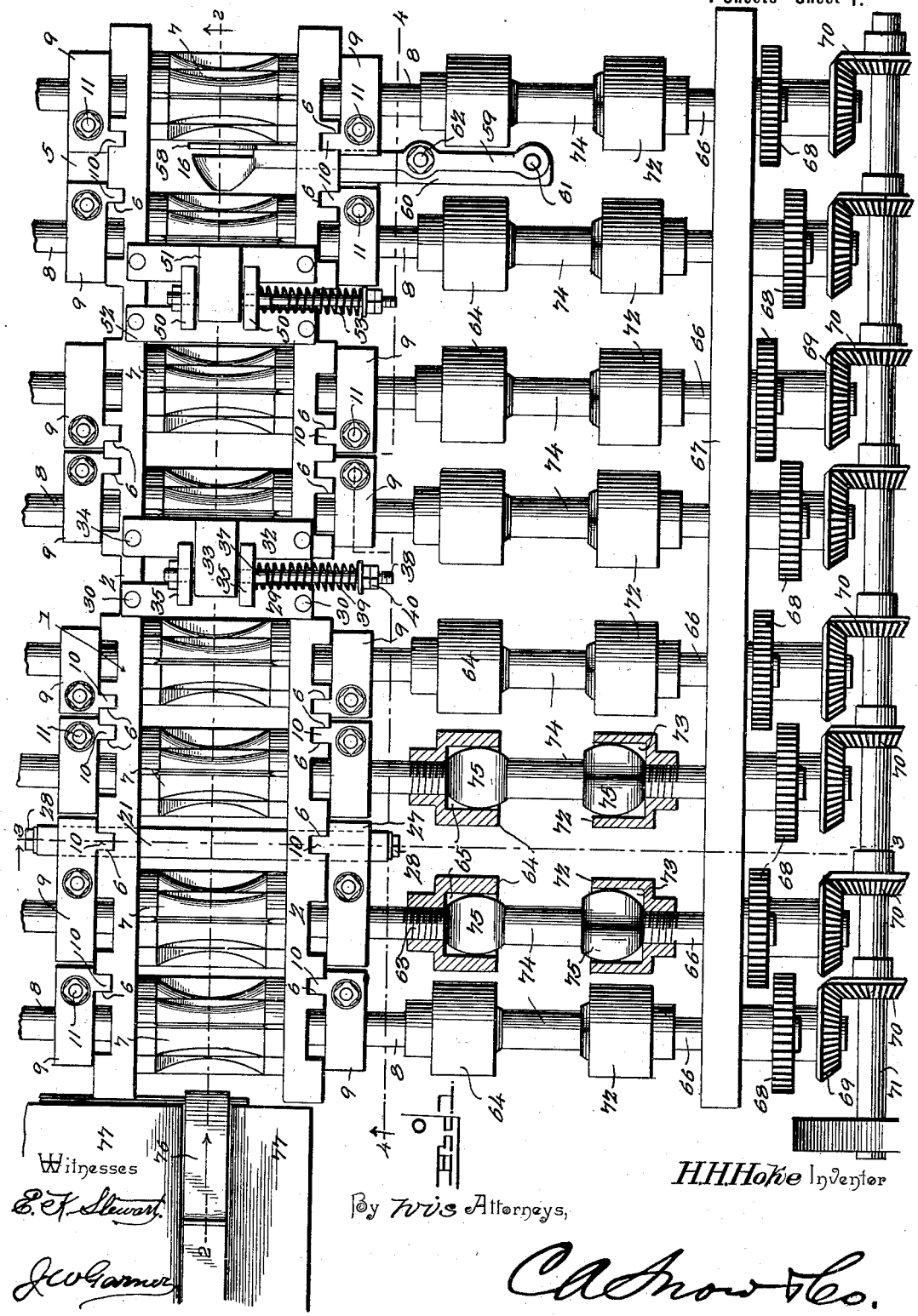
Witnesses
E. K. Stewart
J. W. Garner
By his Attorneys,
C. A. Snow & Co.
H. H. Hoke Inventor

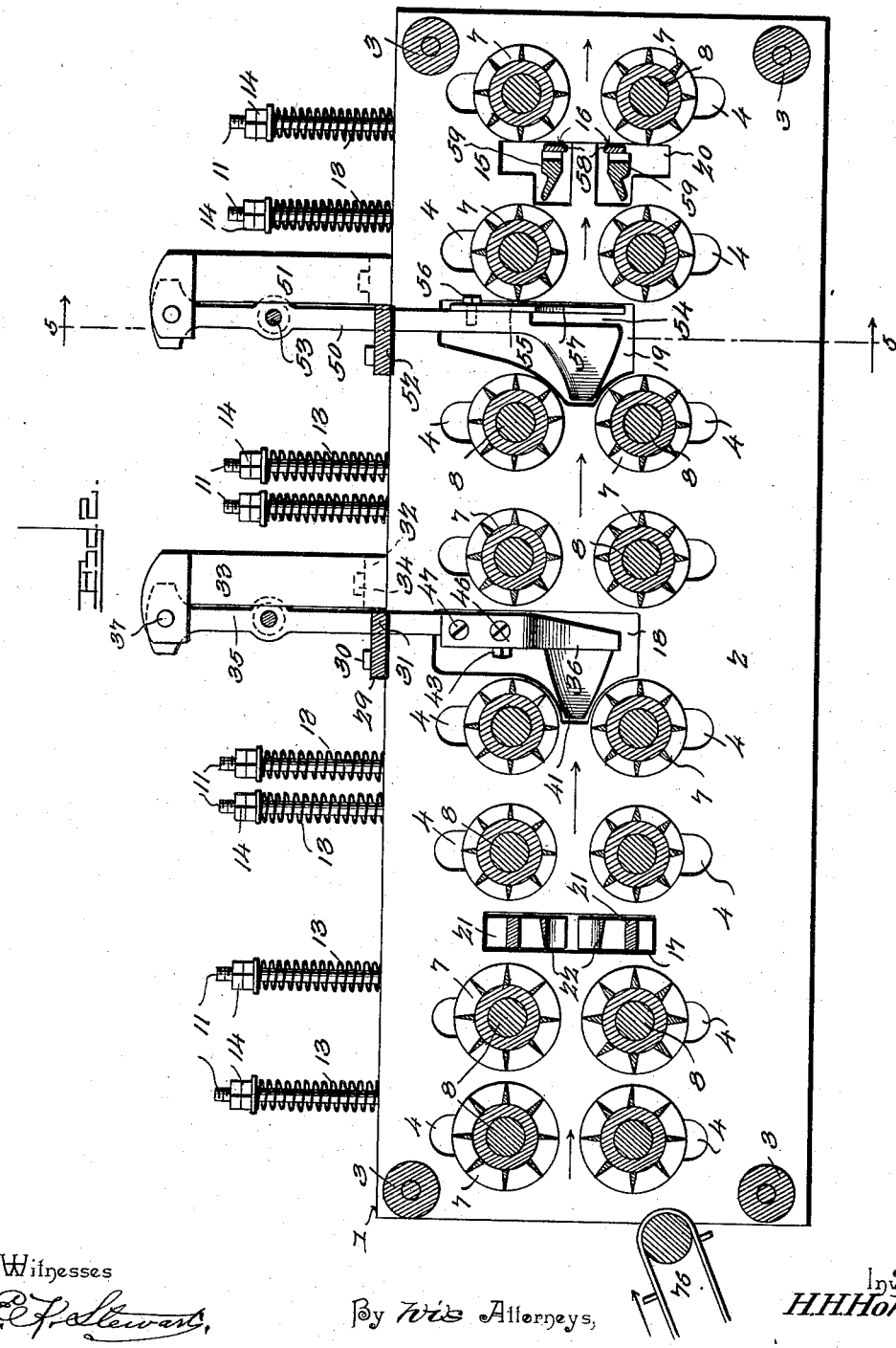

No. 654,540. Patented July 24, 1900.
H. H. HOKE.
MACHINE FOR CUTTING GREEN CORN FROM COBS.
(Application filed Jan. 13, 1900.)
(No Model.) 4 Sheets—Sheet 3.
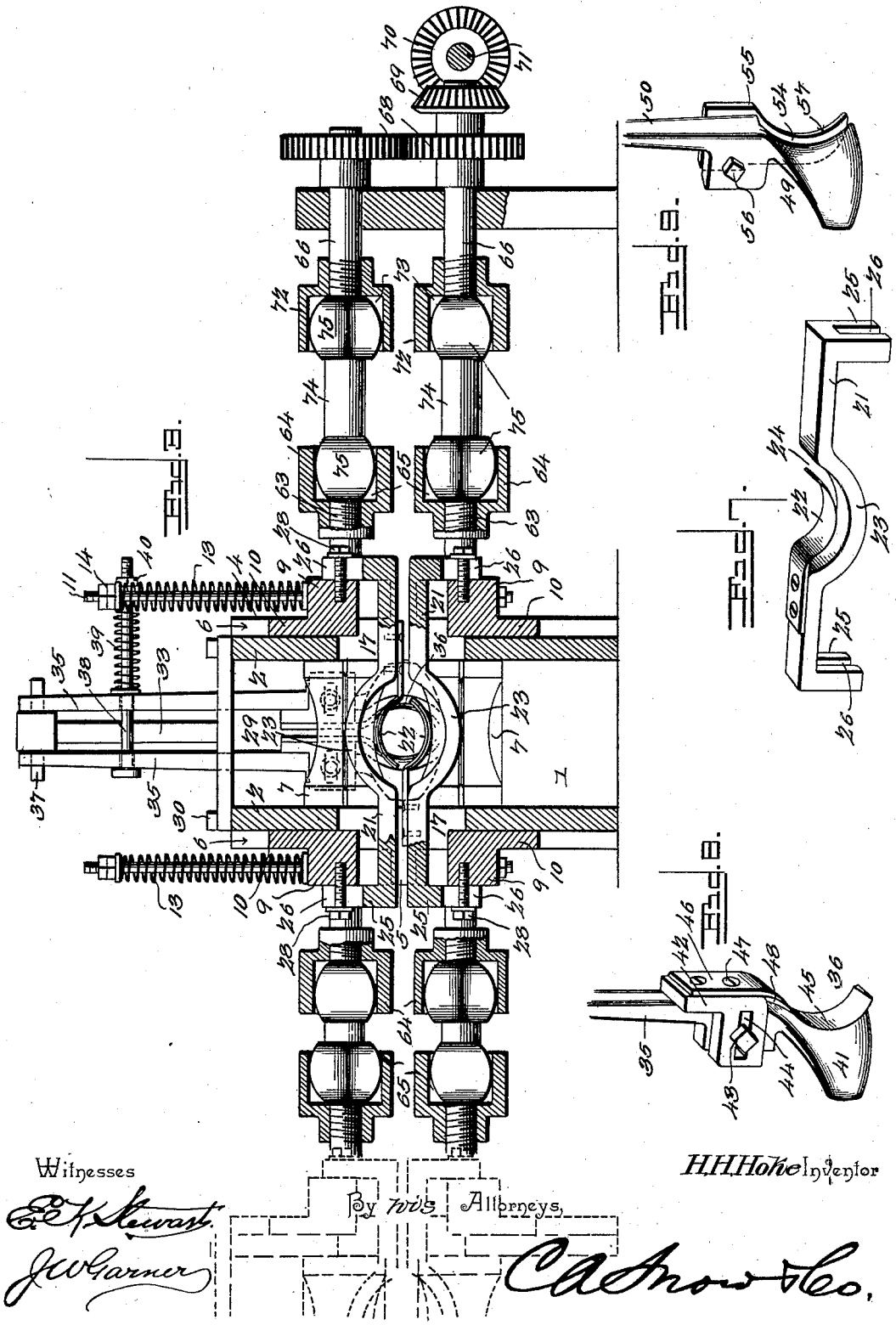
Witnesses
H.H.Hoke Inventor
By his Attorneys, No. 654,540. Patented July 24, 1900.
H. H. HOKE.
MACHINE FOR CUTTING GREEN CORN FROM COBS.
(Application filed Jan. 13, 1900.)
(No Model.) 4 Sheets—Sheet 4.
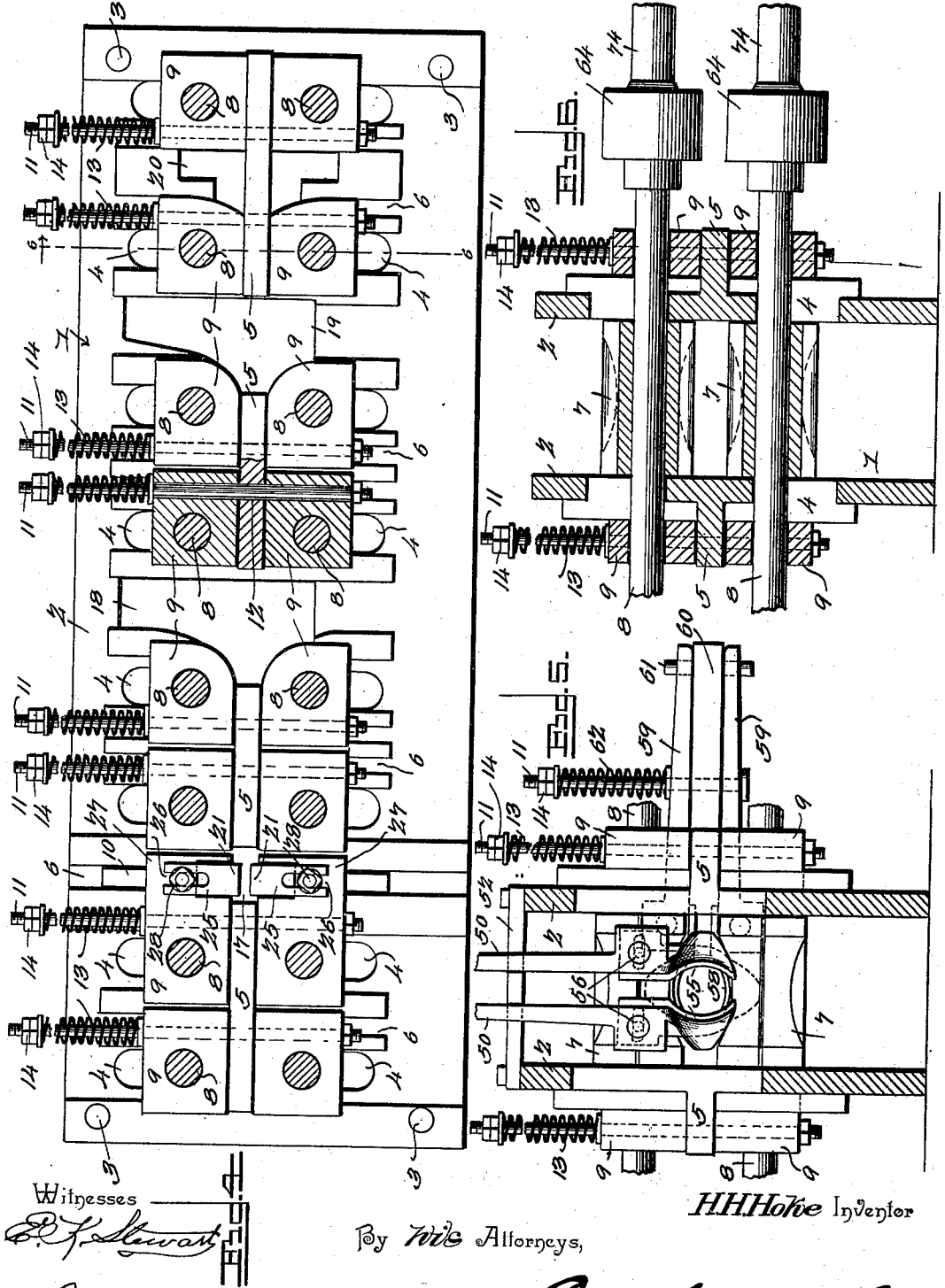

UNITED STATES PATENT OFFICE.

HENRY H. HOKE, OF FREDERICK, MARYLAND.

MACHINE FOR CUTTING GREEN CORN FROM COBS.

SPECIFICATION forming part of Letters Patent No. 654,540, dated July 24, 1900.

Application filed January 13, 1900. Serial No. 1,361. (No model.)

*To all whom it may concern:*

Be it known that I, HENRY H. HOKE, a citizen of the United States, residing at Frederick, in the county of Frederick and State of Maryland, have invented a new and useful Machine for Cutting Green Corn from the Cob, of which the following is a specification.

My invention is an improved machine for cutting green corn from the cob; and one object of my invention is to provide a cheap, simple, and highly-efficient machine which is adapted to be operated singly or to be used in conjunction with a number of others connected together in series, whereby they may be operated simultaneously by the same source of power.

A further object of my invention is to provide flexible couplings for connecting the journals of the feed wheels or rollers to the counter-shaft, so that the former can be driven by the latter and permitted to move vertically and adjust themselves to ears of corn of various sizes while in operation, and which said flexible couplings are also adapted for connecting a number of the machines together in series.

A further object of my invention is to provide novel devices for scraping the green-corn cobs after the grains have been cut therefrom, so as to extract the juices that remain in the cob and in the small ends of the cut grains that remain embedded therein after the cobs leave the cutters.

A further object of my invention is to provide improved tension devices for regulating the compression of the feed-rollers on the ears of green corn and feeding them to the cutters and scrapers.

A further object of my invention is to provide novel supporting devices for the cutters and to adapt the latter to be readily attached to and removed from the machine-frame.

With these and other objects in view my invention consists in the peculiar construction and combination of devices hereinafter fully set forth, and particularly pointed out in the claims.

In the accompanying drawings, Figure 1 is a top plan view of a machine for cutting green corn from the cob embodying my improvements, two of the coupling devices being shown in section. Fig. 2 is a vertical longitudinal sectional view of the same on the line 2 2 of Fig. 1. Fig. 3 is a vertical transverse sectional view taken on the line 3 3 of Fig. 1. Fig. 4 is partly a side elevation of one of my improved machines for cutting green corn from the cob and partly a sectional view of the same, taken on the line 4 4 of Fig. 1. Fig. 5 is a transverse sectional view of the same, taken on the line 5 5 of Fig. 2. Fig. 6 is a similar view taken on the line 6 6 of Fig. 4. Fig. 7 is a detail perspective view of one of the horizontally-disposed removable cutters and its supporting-yoke. Fig. 8 is a detail perspective view of a portion of the stock of one of the vertically-disposed cutters and showing the laterally-adjustable arm and the cutter-blade attached thereto. Fig. 9 is a similar view of a portion of a stock with one of my improved scraping devices secured thereto.

The frame 1 of the machine here shown, illustrating an embodiment of my invention, comprises the pair of vertically-disposed oblong side plates 2 and the transverse rods 3 which connect them together at their corners. Said side plates are provided with the series of vertical openings 4 for the journals of the pairs of feed-rollers and are provided on their outer sides with the central horizontally-disposed lateral flanges 5 and with the vertical guides 6.

The series of pairs of vertically-adjustable feed-rollers 7 for feeding the ears of corn to the fixed cutters have their journals or shafts 8 extended through the openings 4 and adapted to move vertically therein and are mounted in bearing-blocks 9, which are arranged in pairs above and below the flanges 5 and are provided on their inner sides with vertical guide-flanges 10, which operate in the guides 6, with which the side plates are provided. Retaining-rods 11 pass through and connect the blocks 9 together in pairs and pass through openings 12 in the flanges 5, which register with the vertical openings in said pairs of blocks, and on the upper portion of each of the said retaining-rods is a tension-spring 13, engaged by a compression-nut 14 on the threaded portion of the rod, the function of the said retaining-rods and tension-springs being to draw the pairs of feed-rollers together so far as the vertical slots 4 will permit and to adapt the said pairs of feed-rollers to move toward and from each other, as the ears of corn pass between them, and thereby adjust the rollers automatically and enable them to operate on ears of corn which vary in size without unduly compressing said ears of corn or otherwise injuring them.

It will be observed by reference to Figs. 1, 2, and 4 of the drawings that the feed-rollers in my improved machine for cutting green corn from the cob are arranged in batteries of two pairs of rollers each, that the said batteries are spaced somewhat apart to provide room for the location of the fixed cutters and scrapers between the said batteries of rollers, and that the last two pairs of said feed-rollers are spaced somewhat apart, as at 15, to admit of the location of a pair of horizontally-disposed scrapers 16 between said two pairs of rollers. Openings 17, 18, 19, and 20 are made in the side plates 2, coincident with the spaces or intervals between the batteries of feed-rollers and the last two pairs thereof, the openings 17 being vertically-disposed slots, and the openings 18, 19, and 20 conforming substantially in size and shape to the various cutting and scraping devices for which they are adapted, the function of the said openings being to permit said cutting and scraping devices to be passed through the said side plates when attaching them in an operative position in the machine or detaching them therefrom when it becomes necessary to clean or sharpen or repair said cutters and scrapers.

The openings 17 are nearest the feed end of the machine, and in the said openings are adapted to be inserted and to vertically play the horizontally-disposed yoke bars or stocks 21, to which are secured the curved cutting-knives 22, which are adapted to cut the grains of green corn from the upper and lower sides of the cobs as the latter are fed to the said cutters by the first battery of the feed-rollers. The central portions of the yoke bars or stocks 21 are curved outwardly, as at 23, and at some distance from the proximate curved cutting-blades 22, so as to form annular spaces 24 between the proximate sides of the yoke bars or stocks and their cutting-blades 22, these annular spaces being of sufficient width to prevent them from becoming clogged by the grains of corn as the same are cut from the cob. Vertical arms 25 are formed at the ends of the yoke bars or stocks 21 and are provided with adjusting-slots 26. The said arms bear against the outer sides of the proximate pairs of bearing-blocks 9, as shown at Figs. 3 and 4, said proximate pairs of said bearing-blocks 9 having the longitudinal extensions 27 to bear against said arms and adjusting-bolts 28 in said slotted arms and which engage threaded openings in the said bearing-blocks and secure the said yoke-bars 21 to the said bearing-blocks at any desired adjustment, and inasmuch as the said yoke-bars are attached to and supported by the bearing-blocks, in which the journals of a proximate pair of feed-rollers are mounted, the horizontally-disposed cutters are thereby adapted to be adjusted vertically with the said rollers, as will be readily understood, thus adapting the horizontally-disposed cutters to automatically conform to the vertical adjustment of the proximate pair of feed-rollers, and hence to cut the corn from the cobs of ears of various sizes with greatly-increased efficiency.

The side plates 2 are connected together on their upper sides by a bridge-plate 29, which is located above the openings 18 and is secured in place by bolts 30. Rabbets 31 are made on one side of the said bridge-frame. The latter bears against the transversely-disposed bed-plate 32 of a vertical standard 33, said bed-plate being secured on the side plates by bolts 34. Said rabbets 31 form openings between the proximate sides of the bridge-plate 29 and bed-plate 32 for the reception of the vertical stocks 35 of the vertically-disposed pair of cutters 36, which are adapted to cut the grain from the sides of the ears of corn. The upper ends of the stocks 35 are provided with openings for the ends of horizontally-disposed supporting-guides 37, carried by the standard 33, said supporting-guides adapting the vertically-disposed cutters to be adjusted laterally toward and from each other to conform to ears of corn which vary in size, and an adjusting-rod 38 extends through openings in the stocks 35, connects them together, and is provided on its projecting end with a tension-spring 39 and compression-nut 40 to regulate the tension of said spring, the function of the latter being to compress the vertically-disposed cutters on opposite sides of the ears of corn as the latter pass between said cutters and cause the vertically-disposed cutting-blades to operate with maximum efficiency in cutting the grains from the sides of the cobs.

The pair of stocks 35 are provided at their lower ends with curved outwardly-flared guide-pieces 41, which are adapted to dispose the cutters concentrically with relation to the ears of corn, and on each of the said stocks is secured a supporting-arm 42 of the form shown in Fig. 8 by a set-bolt 43, which operates in a horizontal slot 44, with which said supporting-arm is provided. The curved vertically-disposed cutting-blade 45 has a vertical extension 46 at its upper end, which bears against one side of the supporting-arm and is secured thereto by screws 47. The supporting-arms 42 form vertical offsets on the inner sides of the stocks, which serve to dispose and maintain the curved portions 45 of the cutting-blades at a distance from the proximate curved sides of the guide-pieces 41, and thereby form curved or annular spaces 48 between said cutting-blades and said curved guide-pieces of sufficient width to prevent the grains of corn cut by the said cutters from clogging the said spaces. The supporting-arms being laterally adjustable on the stocks, the width of the spaces between said cutting-blades and the curved guide-pieces may be varied at will, as may be required, and, furthermore, this lateral adjustability of the cutting-blades adapts them to be spaced at any required distance apart.

It will be observed by reference to Fig. 2 that the vertically-disposed cutters may be passed through the openings 18 in the side plates in order to secure said cutters in operative position in the machine or to remove the same therefrom when it becomes desirable or necessary to clean or sharpen said cutters.

A pair of vertically-disposed scrapers 49 are provided with stocks 50, which are substantially identical with the stocks 35, and are secured opposite the openings 19 and between two pairs of feed-rollers by a standard 51, bridge-plate 52, and tension devices 53, which are identical in construction and operation with those hereinbefore described in connection with the vertically-disposed cutters. Vertical offsets 54 are made in the rear sides of the stocks 50 at the lower ends thereof, and scraper-plates 55 are secured on the rear side of said stocks by bolts 56, the said scraper-plates having curved cutting edges 57, adapted to bear against the sides of the corn-cobs fed thereto by the feed-rollers after the grains have been cut from the cobs, said scraper-plates 57, in conjunction with horizontally-disposed scraper-plates 58, serving to scrape and compress the exterior surfaces of the corn-cobs and the small ends of the cut grains of corn embedded therein to extract the juice therefrom, which is highly valuable for canning purposes, in connection with the cut grains of corn. The horizontally-disposed scraper-plates 58 are carried by stocks 59, which are substantially identical with the stocks 50 and are secured in a horizontal position and in approximation with each other on the upper and lower sides of a lateral extension or arm 60, with which one of the flanges 5 is provided. The said arm 60 substantially conforms to the standards hereinbefore described and is provided with vertical guides 61, which engage openings in the outer ends of the horizontally-disposed stocks 59 to permit of vertical adjustment of the latter, and consequently of the scraper-plates 58, and said stocks 59 are provided with tension devices 62, which are substantially identical with the tension devices hereinbefore described in connection with the vertically-disposed cutters.

I will now describe my improved means for positively rotating the feed-rollers independently of each other and for connecting said feed-rollers together in series when it is desired to use a number of my improved machines and to operate them in unison.

The ends of the shafts or journals of the feed-rollers are provided with screw-threaded extensions 63 at both ends, on which are screwed caps or heads 64, each of which forms a rectangular socket 65 of a universal-joint member.

As shown in Figs. 1 and 3, a series of operating-shafts 66 are mounted in a suitable bearing-plate 67, disposed to one side of one of my improved machines, said shafts 66 being arranged in pairs and connected together in pairs by spur-wheels 68, which adapt the pairs of shafts 66 to rotate simultaneously and in opposite directions. The lowermost shaft of each pair of shafts 66 is further provided on its extended end with a miter-wheel 69, said miter-wheel 69 engaging similar wheels 70, which are keyed on a counter-shaft 71, which is mounted in suitable bearings (not shown) and is adapted to be driven in any suitable manner by any suitable motor or other source of power. Said shafts 66 are further provided on their inner ends with caps 72, which are identical in construction with the caps 64 and are provided likewise with rectangular sockets 73, which constitute socket members of universal joints.

A series of tumbler-links 74 are employed to connect the shafts 66 with the journals or shafts of the feed-rollers, said links 74 being provided at their ends with heads 75, which are approximately globular in shape, while being quadrangular in cross-section and adapted to fit in the angular sockets of the caps or heads on the ends of the said shafts.

It will be readily understood from the foregoing description and by reference to the accompanying drawings that the links 74 and heads or caps serve to couple the roller-shafts to the operating-shaft 66, so that the rotary motion of the latter may be communicated to the roller-shafts and the roller-shafts permitted to adjust themselves vertically, as hereinbefore described, while continuing in rotation.

When it is desired to use a number of my improved machines together, they are arranged side by side in series and their roller-shafts connected together by the coupling-links and angularly-socketed caps hereinbefore described and as indicated in Fig. 3 of the drawings. In this manner any desired number of my improved machines may be coupled together in series and operated simultaneously, the power being supplied thereto from a single driving-shaft common to all the machines.

By arranging the feed-rollers in batteries of two pairs of rollers each, with the cutters and scrapers located in the spaces between said batteries of rollers, as hereinbefore described, an important advantage is gained in this: that each ear of corn while being fed to a cutter or scraper is sustained by two pairs of rollers, which serve to preserve the ear of corn in a horizontal position while being subjected to the action of the cutter or scraper and obviate any tendency of the ear of corn to tilt or incline.

In the drawings I have illustrated an endless conveyer 76, operating in the bottom of a trough 77, with inclined sides for feeding the corn to the machine, the ears being directed by the inclined sides of the trough onto the endless conveyer, and the latter serving to convey the ears endwise and to feed them to the machine in a position to be grasped and fed through the machine by the feed-rollers, as will be readily understood.

Having thus described my invention, I claim—

1. The combination, with a frame having the horizontal side flanges, of vertically-movable bearing-blocks above and below said flanges, feed-rollers having their journals mounted in said bearing-blocks, rods connecting said blocks in pairs and passing through openings in the said side flanges, and tension-springs on said rods, substantially as described.

2. The combination of the side plates, the vertically-movable bearing-blocks on said side plates, feed-rollers having their journals mounted in said bearing-blocks transversely-disposed yoke-bars connecting said bearing-blocks and having the outwardly-curved central portions, and the cutters secured on said yoke-bars, substantially as described.

3. The combination of the side plates, the vertically-movable bearing-blocks on said side plates, feed-rollers having their journals mounted in said bearing-blocks, transversely-disposed yoke-bars connecting said bearing-blocks and having the outwardly-curved central portions, the cutters secured on said yoke-bars, said yoke-bars having the slotted vertical arms at their ends, and adjusting-screws in said slots and engaging thread-openings in the bearing-blocks, substantially as described.

4. The combination of the side plates having the horizontal side flanges and vertical guides, vertically-movable bearing-blocks above and below said flanges and having vertical guide-flanges which operate in said vertical guides, feed-rollers having their journals mounted in said bearing-blocks, vertical rods connecting said blocks in pairs and in openings in the side flanges, and tension-springs on said rods, substantially as described.

5. In a machine for cutting green corn from the cob, the combination with vertically-movable bearing-blocks and feed-rollers mounted therein, of supporting stocks or yokes connecting said bearing-blocks and vertically adjustable thereon, said stocks or yokes being adapted for the attachment of cutting or scraping devices, for the purpose set forth, substantially as described.

In testimony that I claim the foregoing as my own I have hereto affixed my signature in the presence of two witnesses.

HENRY H. HOKE.

Witnesses:
J. M. WOOD,
JOHN D. KELLER.